(12) United States Patent
Canfield et al.

(10) Patent No.: US 7,421,661 B1
(45) Date of Patent: Sep. 2, 2008

(54) INSTANT MESSAGING INTERFACE HAVING AN INFORMATIONAL TOOL TIP

(75) Inventors: James Andrew Canfield, Arlington, VA (US); Kenneth Carbone, Annandale, VA (US); David Fairlie Colburn, Reston, VA (US); Linda Nols Myers, Purcellville, VA (US); Thomas E. Van Lenten, Ashburn, VA (US); Gregory Alan Willis, Arlington, VA (US)

(73) Assignee: AOL LLC, Dulles, VA (US)

( * ) Notice: Subject to any disclaimer, the term of this patent is extended or adjusted under 35 U.S.C. 154(b) by 549 days.

(21) Appl. No.: 10/259,844

(22) Filed: Sep. 30, 2002

Related U.S. Application Data

(60) Provisional application No. 60/376,181, filed on Apr. 30, 2002.

(51) Int. Cl.
G06F 3/00 (2006.01)
(52) U.S. Cl. .................. 715/752; 715/711; 715/715; 715/808
(58) Field of Classification Search ................ 715/715, 715/711
See application file for complete search history.

(56) References Cited

U.S. PATENT DOCUMENTS

| | | | |
|---|---|---|---|
| 5,283,560 A | 2/1994 | Bartlett | |
| 5,287,514 A | 2/1994 | Gram | |
| 5,307,086 A | 4/1994 | Griffin et al. | |
| 5,416,895 A | 5/1995 | Anderson et al. | |
| 5,544,352 A | 8/1996 | Egger | |
| 5,546,528 A | 8/1996 | Johnston | |
| 5,581,670 A | 12/1996 | Bier et al. | |
| 5,588,107 A | 12/1996 | Bowden et al. | |
| 5,617,114 A | 4/1997 | Bier et al. | |
| 5,617,526 A * | 4/1997 | Oran et al. ............... 715/779 |
| 5,627,960 A | 5/1997 | Clifford et al. | |
| 5,644,737 A | 7/1997 | Tuniman et al. | |
| 5,664,133 A | 9/1997 | Malamud et al. | |
| 5,692,142 A | 11/1997 | Craycroft et al. | |
| 5,712,995 A | 1/1998 | Cohn | |
| 5,721,852 A | 2/1998 | Porter | |
| 5,742,813 A | 4/1998 | Kavanagh et al. | |
| 5,754,176 A | 5/1998 | Crawford | |
| 5,760,768 A | 6/1998 | Gram | |
| 5,798,752 A | 8/1998 | Buxton et al. | |
| 5,801,703 A | 9/1998 | Bowden et al. | |

(Continued)

OTHER PUBLICATIONS

"Design Requirements Documents (DRD)," Instant AOL, Instant AOL Refresh v1.1, Document Version 8.0, Oct. 23, 2001, 8 pages.

(Continued)

*Primary Examiner*—David Wiley
*Assistant Examiner*—Ryan Pitaro
(74) *Attorney, Agent, or Firm*—Fish & Richardson P.C.

(57) ABSTRACT

An interface enables perception of information regarding a communications session that leverages an instant messaging platform. The user interface includes an instant messaging application user interface that enables perception and selection of instant messaging communications sessions for an instant messaging user, a mechanism to determine the content from within a desired instant messaging session that is not actively displayed, and an informational tool tip that provides a perceivable indication to the user of at least a portion of the determined content of the desired instant messaging session.

52 Claims, 11 Drawing Sheets

U.S. PATENT DOCUMENTS

| | | | |
|---|---|---|---|
| 5,832,494 | A | 11/1998 | Egger et al. |
| 5,838,315 | A | 11/1998 | Craycroft et al. |
| 5,877,758 | A | 3/1999 | Seybold |
| 5,877,765 | A | 3/1999 | Dickman et al. |
| 5,884,306 | A | 3/1999 | Bliss et al. |
| 5,929,851 | A | 7/1999 | Donnelly |
| 5,936,625 | A | 8/1999 | Kahl et al. |
| 5,937,417 | A | 8/1999 | Nielsen |
| 5,959,621 | A | 9/1999 | Nawaz et al. |
| 5,974,413 | A | 10/1999 | Beauregard et al. |
| 5,990,905 | A | 11/1999 | Chew et al. |
| 5,995,101 | A | 11/1999 | Clark et al. |
| 6,002,398 | A | 12/1999 | Wilson |
| 6,002,400 | A | 12/1999 | Loring et al. |
| 6,018,571 | A | 1/2000 | Langlois et al. |
| 6,057,844 | A | 5/2000 | Strauss |
| 6,078,935 | A | 6/2000 | Nielsen |
| 6,081,830 | A | 6/2000 | Schindle |
| 6,091,409 | A | 7/2000 | Dickman et al. |
| 6,092,068 | A | 7/2000 | Dinkelacker |
| 6,097,389 | A | 8/2000 | Morris et al. |
| 6,118,427 | A | 9/2000 | Buxton et al. |
| 6,144,375 | A | 11/2000 | Jain et al. |
| 6,147,685 | A | 11/2000 | Bliss et al. |
| 6,173,316 | B1 | 1/2001 | De Boor et al. |
| 6,188,403 | B1 | 2/2001 | Sacerdoti et al. |
| 6,212,548 | B1 | 4/2001 | DeSimone et al. |
| 6,229,539 | B1 | 5/2001 | Morcos et al. |
| 6,233,571 | B1 | 5/2001 | Egger et al. |
| 6,233,726 | B1 | 5/2001 | Bowman et al. |
| 6,237,135 | B1 | 5/2001 | Timbol |
| 6,246,411 | B1 | 6/2001 | Strauss |
| 6,248,946 | B1 | 6/2001 | Dwek |
| 6,252,594 | B1 | 6/2001 | Xia et al. |
| 6,260,148 | B1 | 7/2001 | Aggarwal et al. |
| 6,275,790 | B1 | 8/2001 | Yamamoto et al. |
| 6,281,879 | B1* | 8/2001 | Graham .................... 345/157 |
| 6,301,609 | B1 | 10/2001 | Aravamudan et al. |
| 6,304,879 | B1 | 10/2001 | Sobeski et al. |
| 6,317,128 | B1 | 11/2001 | Harrison et al. |
| 6,346,952 | B1 | 2/2002 | Shtivelman |
| 6,362,842 | B1 | 3/2002 | Tahara et al. |
| 6,369,837 | B1 | 4/2002 | Schirmer |
| 6,377,944 | B1 | 4/2002 | Busey et al. |
| 6,381,735 | B1 | 4/2002 | Hunt |
| 6,384,849 | B1 | 5/2002 | Morcos et al. |
| 6,407,757 | B1 | 6/2002 | Ho |
| 6,434,599 | B1 | 8/2002 | Porter |
| 6,519,629 | B2 | 2/2003 | Harvey et al. |
| 6,539,421 | B1 | 3/2003 | Appleman et al. |
| 6,665,395 | B1 | 12/2003 | Busey et al. |
| 6,691,159 | B1 | 2/2004 | Grewal et al. |
| 6,731,308 | B1 | 5/2004 | Tang et al. |
| 6,784,901 | B1* | 8/2004 | Harvey et al. ............ 715/757 |
| 6,907,447 | B1 | 6/2005 | Cooperman et al. |
| 6,981,223 | B2* | 12/2005 | Becker et al. ............ 715/753 |
| 7,017,119 | B1 | 3/2006 | Johnston et al. |
| 2002/0073207 | A1 | 6/2002 | Widger et al. |
| 2002/0097277 | A1 | 7/2002 | Pitroda |
| 2002/0101446 | A1* | 8/2002 | Tang et al. ................. 345/751 |
| 2002/0130904 | A1 | 9/2002 | Becker et al. |
| 2002/0160819 | A1 | 10/2002 | Daurensan |
| 2002/0163545 | A1 | 11/2002 | Hii |
| 2003/0030670 | A1* | 2/2003 | Duarte et al. ............. 345/758 |
| 2003/0052915 | A1 | 3/2003 | Brown et al. |
| 2003/0142141 | A1 | 7/2003 | Brown et al. |
| 2003/0164862 | A1* | 9/2003 | Cadiz et al. ............... 345/838 |
| 2003/0210265 | A1 | 11/2003 | Haimberg |

OTHER PUBLICATIONS

"Design Requirements Document (DRD)," Gamera, Revision 18, Apr. 10, 2001, 110 pages.

"AOL IM Companion", Tricon Software & Development, published Mar. 7, 2001. 7 total pages retrieved Jul. 16, 2003 from World Wide Web: http://download.com.com/3000-2150-5056089.html?legacy=cnet (1 page); http://www.triconsoft.com/screenshots/mnuIMAnswer.jpg (1 page); http://www.triconsoft.com/screenshots/mnuOptions.jpg (1 page); http://www.triconsoft.com/screenshots/IMCompanionTabs.jpg (1 page); http://www.triconsoft.com/screenshots/IMCompanionListBox.jpg (1 page); http://www.triconsoft.com/IMCompanion.asp (2 pages).

"Move or Cover Sheets", Microsoft Excel 2000 Help File. 8 total pages retrieved Jul. 21, 2003 from World Wide Web: http://www.trioconsoft.com/IMCompanionShots.asp (4 pages); mk:@MSITStore:C:\Program%20Files\Microsoft%20Office\Office\1033\xlmain9.chm::/htm . . . (1 page); About Microsoft Excel (3 pages).

"A.I.M Frames", BPS Software, lastest version Jul. 3, 2003, first published version Jun. 1, 1998. 7 total pages retrieved Jul. 11, 2003 from World Wide Web: http://www.bpssoft.com/AIMFrame/index.htm (3 pages); http://www.bpssoft.com/AIMFrame/history.htm (4 pages).

"Power Tools Pro", BPS Software, first published release May 10, 2000. 24 total pages retrieved Jul. 16, 2003 from World Wide Web: http://www.bpssoft.com/PowerTools/history.htm (19 pages); http://www.bpssoft.com/PowerTools/images/shots/9pwrim.gif (1 page); http://www.bpssoft.com/PowerTools/ptshots.htm (4 pages).

International Search Report (6 pages).

Anonymous "GameSpy Arcade—Play Hundreds of Online Multiplayer Games", Internet Document, [Online], pp. 1-3, retrieved from the internet, http://www.gamespyarcade.com/support/help/communicate.shtml [retrieved on Apr. 12, 2004].

Amanda Matthiesen, "Hotmail Help: A Brief Introduction to the Free E-mail Service", May 2000, Internet: http://www.town.brookline.ma.us/library/computer/hotmail.htm.

Tricon Software, "Tricon Software & Development", Apr. 20, 2001, Internet: http://www.triconsoft.com.

U.S. Appl. No. 09/405,904, Eric Bosco et al., Entitled: Computer-Implemented Ticker Display.

U.S. Appl. No. 09/405,904, Eric Bosco et al., Entitled: Computer-Implemented Ticker Display, Sep. 24, 1999.

International Search Report (6 pages), Sep. 2003.

* cited by examiner

400

INSTANT MESSAGING INTERFACE HAVING AN INFORMATIONAL TOOL TIP

This application claims priority from U.S. Provisional Application No. 60/376,181, filed Apr. 30, 2002, which is incorporated by reference.

TECHNICAL FIELD

The following description relates generally to providing a user interface and more particularly to providing an informational tool tip for an instant messaging user interface.

BACKGROUND

Online service providers facilitate access to information and services by providing interactive UIs (User Interfaces) that help users navigate to desired resources. Generally, a UI allows a user to execute particular commands or to link to certain locations by simply selecting screen objects such as icons, windows, and drop-down menus. The design of a UI has a significant impact on a user's online experience. In particular, the icons, the windows, and the menus of a UI may be arranged to enable a user to locate preferred information and services quickly and easily.

SUMMARY

In one general aspect, an interface enables perception of information regarding a communications session that leverages an instant messaging platform. The user interface includes an instant messaging application user interface that enables perception and selection of instant messaging communications sessions for an instant messaging user, a mechanism to determine the content from within a desired instant messaging session that is not actively displayed, and an informational tool tip that provides a perceivable indication to the user of at least a portion of the determined content of the desired instant messaging session.

Implementations may include one or more of the following features. For example, the tool tip may be activated in response to user selection of the desired instant messaging session. In one implementation, the user selection may be inferred based upon the position of a user input device relative to the instant messaging communications session. For instance, the selection may be inferred based upon maintaining the user input device in a position relative to the instant messaging communications session for a predetermined threshold period of time. In another implementation, the user selection may be an overt selection activity. For instance, the overt selection may be carried out by manipulating a user input device.

In one implementation, the informational tool tip may be rendered in a pop up window, and may be rendered as an overlay. The tool tip may provide a perceivable indication of less than all of the determined content of the desired instant messaging session. The tool tip may be closed automatically.

In another implementation, the interface includes one or more instant messaging sub-interfaces that represent distinct and concurrent instant messaging communications sessions. The interface may also include interface tabs associated with one or more of the sub-interfaces. The interface tabs enable user selection among the sub-interfaces, and each interface tab persists beyond active display of the associated sub-interface. The tool tip may be activated in response to user selection of the interface tab associated with the desired instant messaging session. For instance, the tool tip may be activated based on the position of a user input device that is proximate to one of the interface tabs associated with the desired instant messaging session.

In one implementation, the user interface is a visual interface. For example, the desired instant messaging session may include an exchange of one or more text messages, or one or more audio-video messages such as a video message. In another implementation, the user interface may be an audible interface. For example, the desired instant messaging session may include an exchange of one or more audio messages, or one or more audio-visual messages such as a video message.

Aspects of the informational tool tip may be implemented by an apparatus and/or by a computer program stored on a computer readable medium. The computer readable medium may comprise a disc, a client device, a host device, and/or a propagated signal. In addition, aspects of the informational tool tip may be implemented in a client/host context or in a standalone or offline client device. The informational tool tip may be rendered in a client/host context and may be accessed or updated through a remote device in a client/host environment. The informational tool tip also may be rendered by the standalone/offline device and may be accessed or updated through a remote device in a non-client/host environment such as, for example, a LAN server serving an end user or a mainframe serving a terminal device.

Other features will be apparent from the following description, including the drawings, and from the claims.

DESCRIPTION OF DRAWINGS

Like reference symbols in the various drawings indicate like elements.

DETAILED DESCRIPTION

In general, an informational tool tip may be provided for an instant messaging (IM) user interface (UI), such as a tabbed IM UI having one or more interface tabs, where each interface tab is assigned to a pending IM session, and the tabs may appear adjacent to one another to, among other things, enable selection of and switching between IM sessions. When several interface tabs are displayed, the active tab corresponds to the IM session currently being viewed or manipulated by the user, and inactive tabs are rendered for the IM sessions which are not currently being viewed or manipulated by the user.

An informational tool tip for the IM UI may be capable of presenting to the user a perceivable indication of at least a portion of an IM communications session that is not being actively displayed. As such, the informational tool tip is able to accommodate a user who seeks to perceive information about one of the inactive IM sessions that is not actively displayed to the user, while maintaining active display of the currently active IM session.

In order to activate the informational tool tip, the user may select a desired IM session that is not being actively displayed. For example, to activate and render the informational tool tip, the user may position a mouse or other viewer input device proximate to or over the interface tab corresponding to the desired IM session. The informational tool tip may be rendered in any location on the display.

The informational tool tip may be used to present all or a portion of the desired IM communications session. In one implementation, a pre-determined number of lines or characters of the desired IM session are presented. In another implementation, a pre-determined number of messages communicated between the buddy and the user are presented. In yet another implementation, only recent messages communicated within a predetermined threshold time period are displayed. For example, the informational tool tip may show all messages communicated within the last thirty (30) minutes. In still another implementation, the tool tip may show the entire IM session. The contents of the desired IM session may be made available to the tool tip by, for example, a client system or a host system, or a combination thereof.

Typically, IM communications involve an instantaneous or nearly instantaneous communication between two users, where each user is able to perceive online presence information regarding other selected users ("buddies"). The IM communications are typically peer-to-peer after authentication has been performed. Examples of IM communications exist over AIM, AOL Instant Messaging, Yahoo Messenger, MSN, and ICQ, among others.

Figure 1:
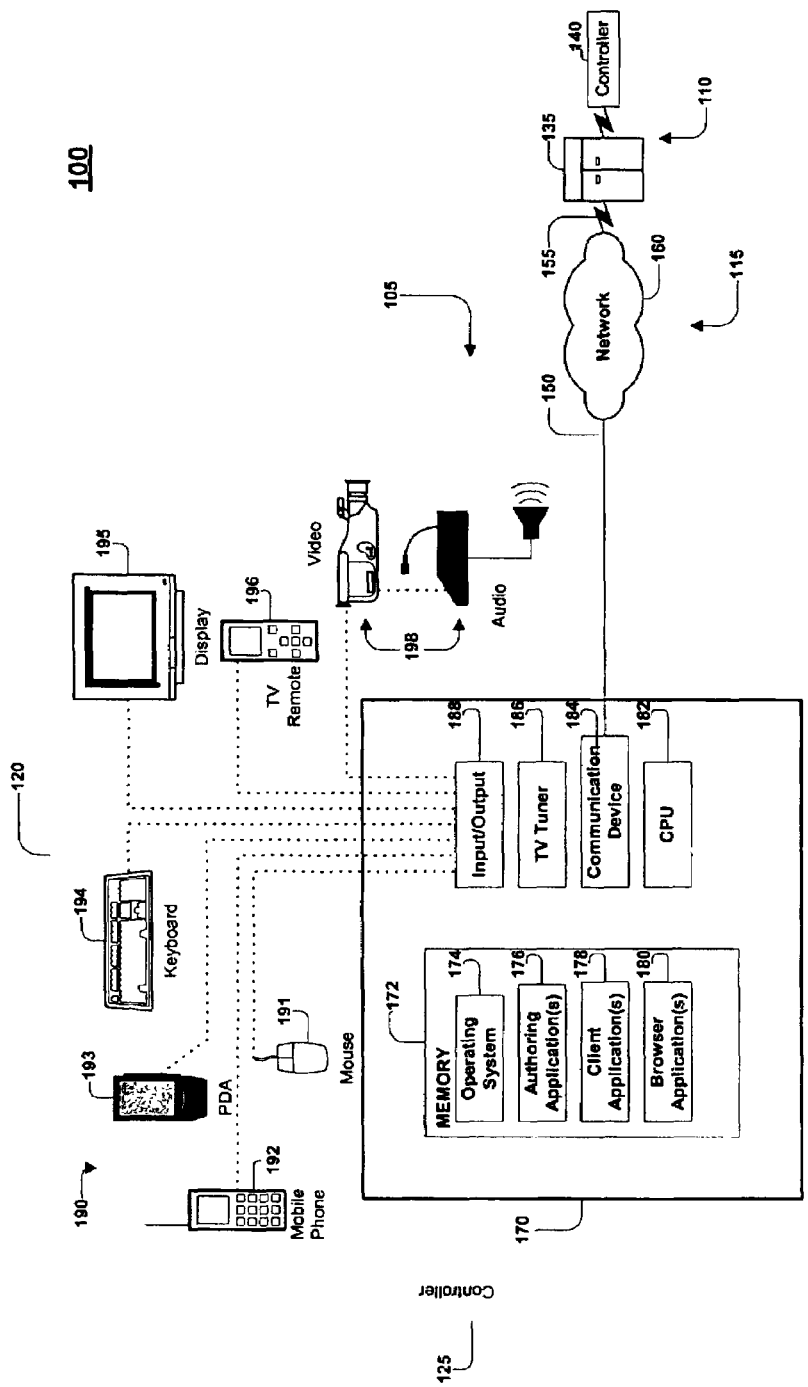
FIGS. 1-3 are block diagrams of a communications system.
Figure 2:
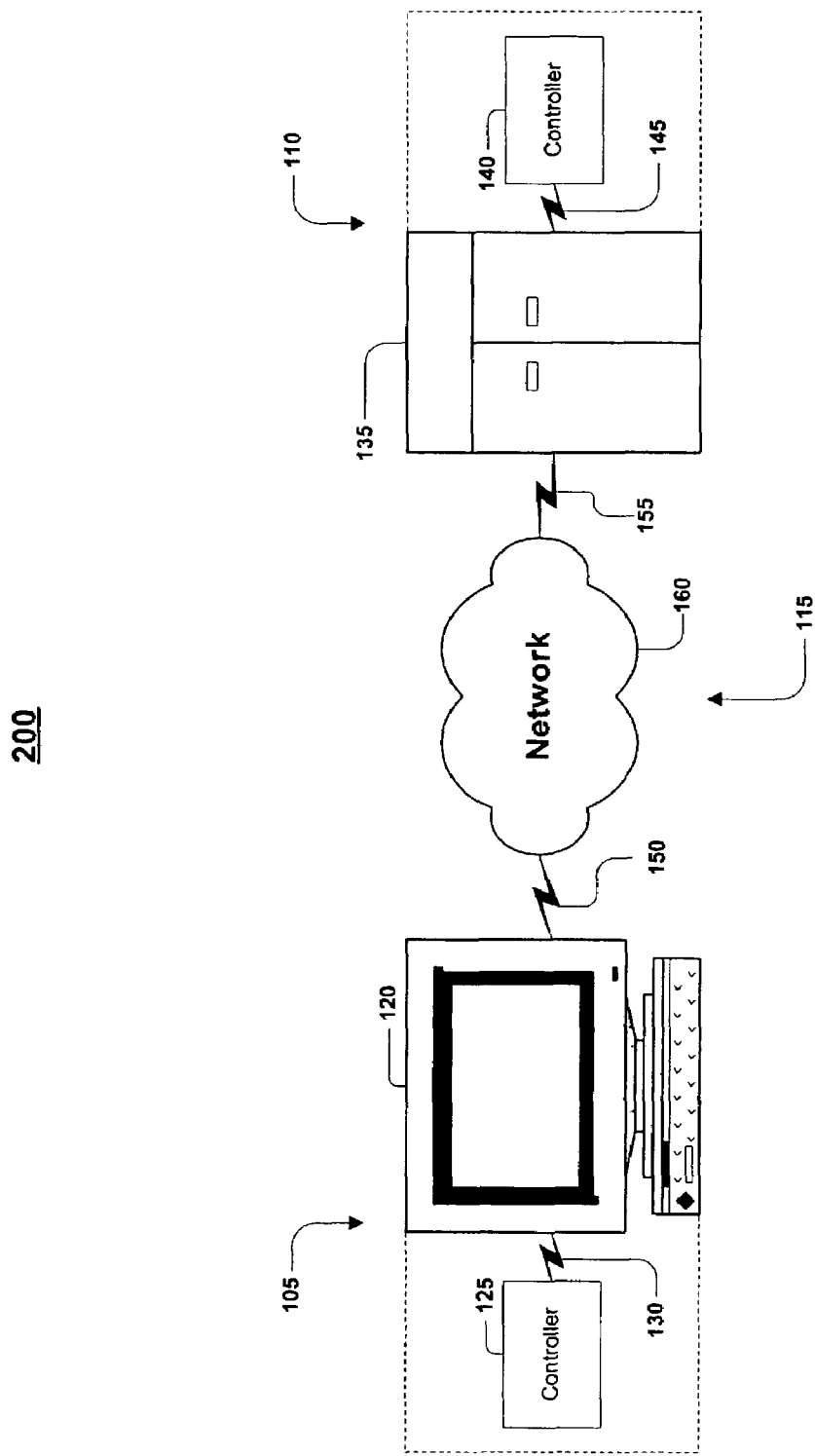

For illustrative purposes, FIGS. 1 and 2 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

FIG. 1 illustrates a communications system 100 including a client system 105 communicating with a host system 110 through a communications link 115.

The client device 120 typically includes a general-purpose computer 170 having an internal or external memory 172 for storing data and programs such as an operating system 174 (e.g., DOS, Windows™, Windows 95™, Windows 98, Windows 2000™, Windows Me™, Windows XP™, Windows NT™, OS/2, or Linux) and one or more application programs. Examples of application programs include authoring applications 176 (e.g., word processing, database programs, spreadsheet programs, or graphics programs) capable of generating documents or other electronic content; client applications 178 (e.g., America Online (AOL) client, CompuServe client, AOL Instant Messenger (AIM) client, interactive television (ITV) client, Internet Service Provider (ISP) client, or instant messaging (IM) client) capable of communicating with other computer users, accessing various computer resources, and viewing, creating, or otherwise manipulating electronic content; and browser applications 180 (e.g., Netscape's Navigator or Microsoft's Internet Explorer) capable of rendering standard Internet content and other content formatted according to standard protocols such as the Hypertext Transfer Protocol (HTTP).

One or more of the application programs may be installed on the internal or external storage 172 of the general-purpose computer 170. Alternatively, in another implementation, the client controller 125 may access application programs externally stored in and/or performed by one or more device(s) external to the general-purpose computer 170.

The general-purpose computer 170 also includes a central processing unit 182 (CPU) for executing instructions in response to commands from the client controller 125. The general-purpose computer 170 may include a communication device 184 for sending and receiving data. One example of the communication device 184 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 170 also may include a television ("TV") tuner 186 for receiving television programming in the form of broadcast, satellite, and/or cable TV signals. As a result, the client device 120 can selectively and/or simultaneously display network content received by communications device 184 and TV programming content received by the TV tuner 186.

The general-purpose computer 170 may include an input/output interface 188 that enables wired or wireless connection to various peripheral devices 190. Examples of peripheral devices 190 include, but are not limited to, a mouse 191, a mobile phone 192, a personal digital assistant 193 (PDA), an MP3 player (not shown), a keyboard 194, a display monitor 195 with or without a touch screen input, a TV remote control 196 for receiving information from and rendering information to users, and an audiovisual input device 198.

Although FIG. 1 illustrates devices such as a mobile telephone 192, a PDA 193, and a TV remote control 196 as being peripheral with respect to the general-purpose computer 170, in another implementation, such devices may themselves include the functionality of the general-purpose computer 170 and operate as the client device 120. For example, the mobile phone 192 or the PDA 193 may include computing and networking capabilities and function as a client device 120 by accessing the delivery network 160 and communicating with the host system 110. Furthermore, the client system 105 may include one, some or all of the components and devices described above.

Referring to FIG. 2, a communications system 200 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 and the host device 135 are generally capable of executing instructions under the command of, respectively, a client controller 125 and a host controller 140. The client device 120 and the host device 135 are connected to, respectively, the client controller 125 and the host controller 140 by, respectively wired or wireless data pathways 130 and 145, which are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. Public Switched Telephone Network (PSTN), Integrated Services Digital Network (ISDN), and Digital Subscriber Line (xDSL)), radio, television, cable, or satellite systems, and other delivery mechanisms for carrying data. The communications link 115 may include communication pathways 150, 155 that enable communications through the one or more delivery networks 160 described above. Each of the communication pathways 150, 155 may include, for example, a wired, wireless, cable or satellite communication pathway.

Figure 3:
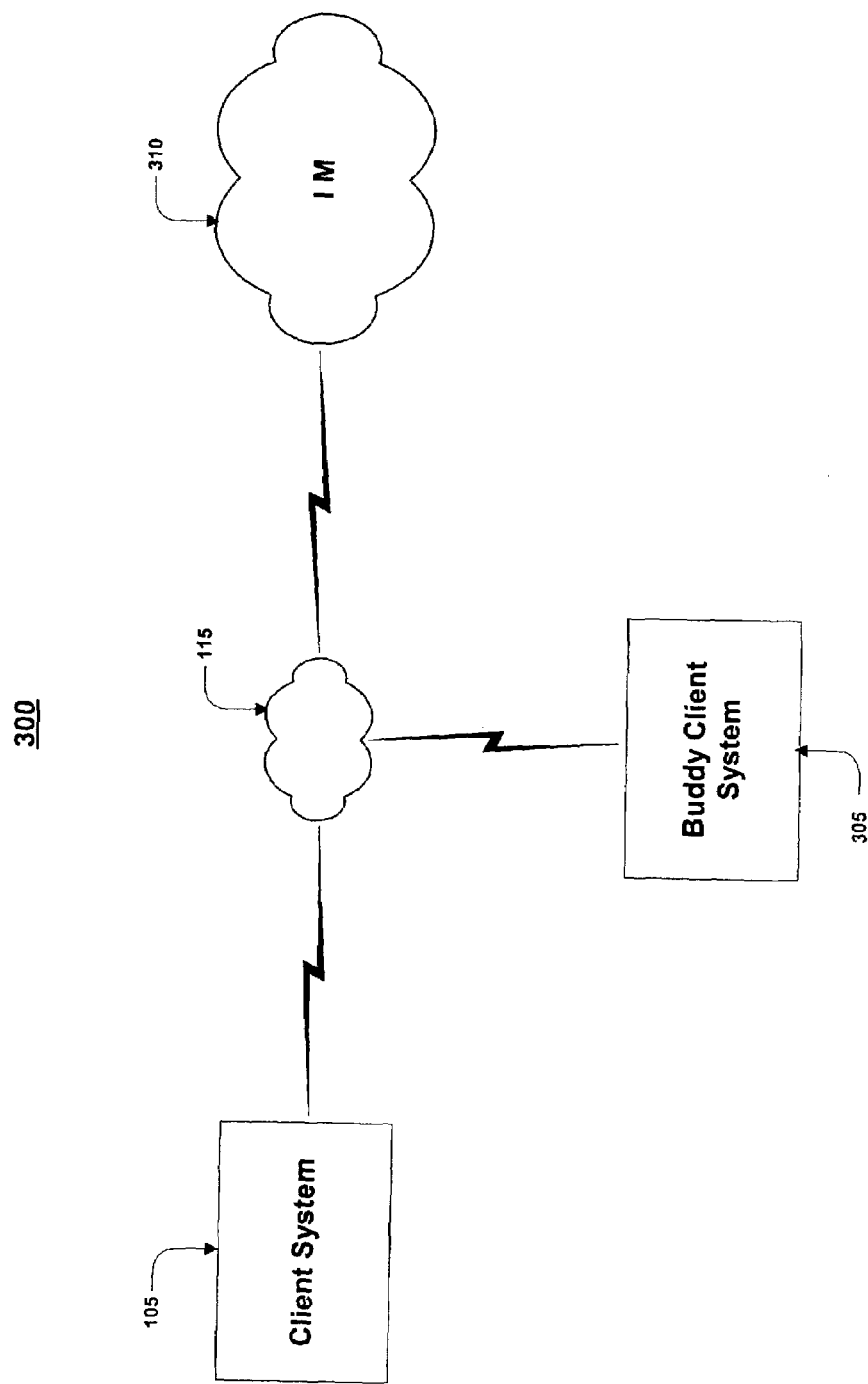

FIG. 3 illustrates a communications system 300 including a client system 105 communicating with a buddy client system 305 and an IM host system 310 through a communication link 115. Such a communications system may be used by users of IM service providers, such as, for example, AIM, ICQ, Yahoo Messenger, and Microsoft Messenger.

In one implementation, the IM host system 310 may have characteristics similar to those described above with respect to host system 110, and the client system 105 and the buddy client system 305 may include communication software to enable access by users to the IM host system 310.

The IM host system 310 may support IM services irrespective of a user's network or Internet access. Thus, the IM host system 310 may allow users to send and receive IMs, regardless of whether they have access to any particular ISP. The IM host system 310 also may support associated services, such as administrative matters, advertising, directory services, chat, and interest groups related to the IM. The IM host system 310 has an architecture that enables the devices (e.g., servers) within the IM host system 310 to communicate with each other. To transfer data, the IM host system 310 employs one or more standard or exclusive IM protocols.

To access the IM host system 310 to begin an IM session in the implementation of FIG. 3, the client system 105 establishes a connection to the IM host system 310. Once the connection to the IM host system 310 has been established, the client system 105 may directly or indirectly transmit data to and access content from the IM host system 310. By accessing the IM host system, a user can use the IM client application to view whether particular users ("buddies") are online, exchange IMs with particular buddies, participate in group chat rooms, trade files such as pictures, invitations or documents, find other buddies with similar interests, get customized information such as news and stock quotes, and search the Web. Buddy client system 305 may be similarly manipulated to establish contemporaneous connection with IM host system 310.

Once connectivity is established, a user who is using client system 105 may view whether a buddy using buddy client system 305 is online, and typically may view whether the buddy is able to receive IMs. If the buddy is online, the user may exchange IMs with that buddy.

In one implementation, the IMs sent between client system 105 and buddy client system 305 are routed through IM host system 310. In another implementation, the IMs sent between client system 105 and buddy client system 305 are routed through a third party server (not shown), and also may optionally be routed through IM host system 310. In yet another implementation, the IMs are sent directly between client system 105 and buddy client system 305.

Figure 4:
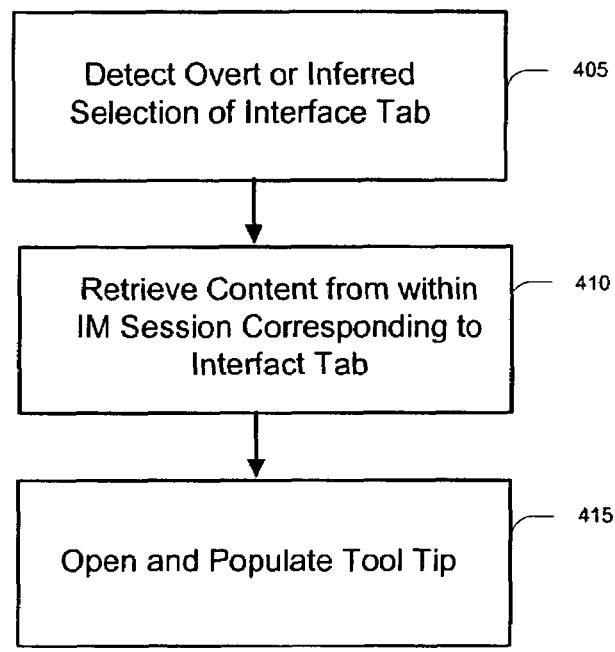
FIG. 4 is a flow chart of a process that may be implemented by the systems of FIGS. 1-3.

FIG. 4 illustrates an exemplary procedure 400 for opening and populating a tool tip window. The procedure 400 may be implemented by any type of hardware, software, device, computer, computer system, equipment, component, program, application, code, storage medium, or propagated signal.

In procedure 400, the overt or inferred selection of an interface tab or other interface item corresponding to an IM session is detected (step 405). For example, a selection may be inferred by the positioning of a mouse or other input device position over or proximate to the interface tab or other interface item. In one implementation, if the position of the mouse pointer is, or remains for a predetermined threshold period of time, proximate to or positioned over the interface tab, a selection of the interface tab or other interface item is inferred. An overt selection of an interface tab or other interface item may also be made. For example, a button or other control on a mouse or other input device may be manipulated to make the overt selection. Next, content from within the IM session corresponding to the interface tab or other interface item is retrieved (step 410). In one implementation, all of the content of the IM session is retrieved. In another implementation, only a portion of the content of the IM session is retrieved. The tool tip is then opened and populated (step 415) with the content retrieved in step 410. For example, the tool tip may be opened and may appear as a rectangular pop-up window proximate to the interface tab over which the mouse is positioned. In other implementations, the tool tip may be opened in other locations on the display.

Figure 5:
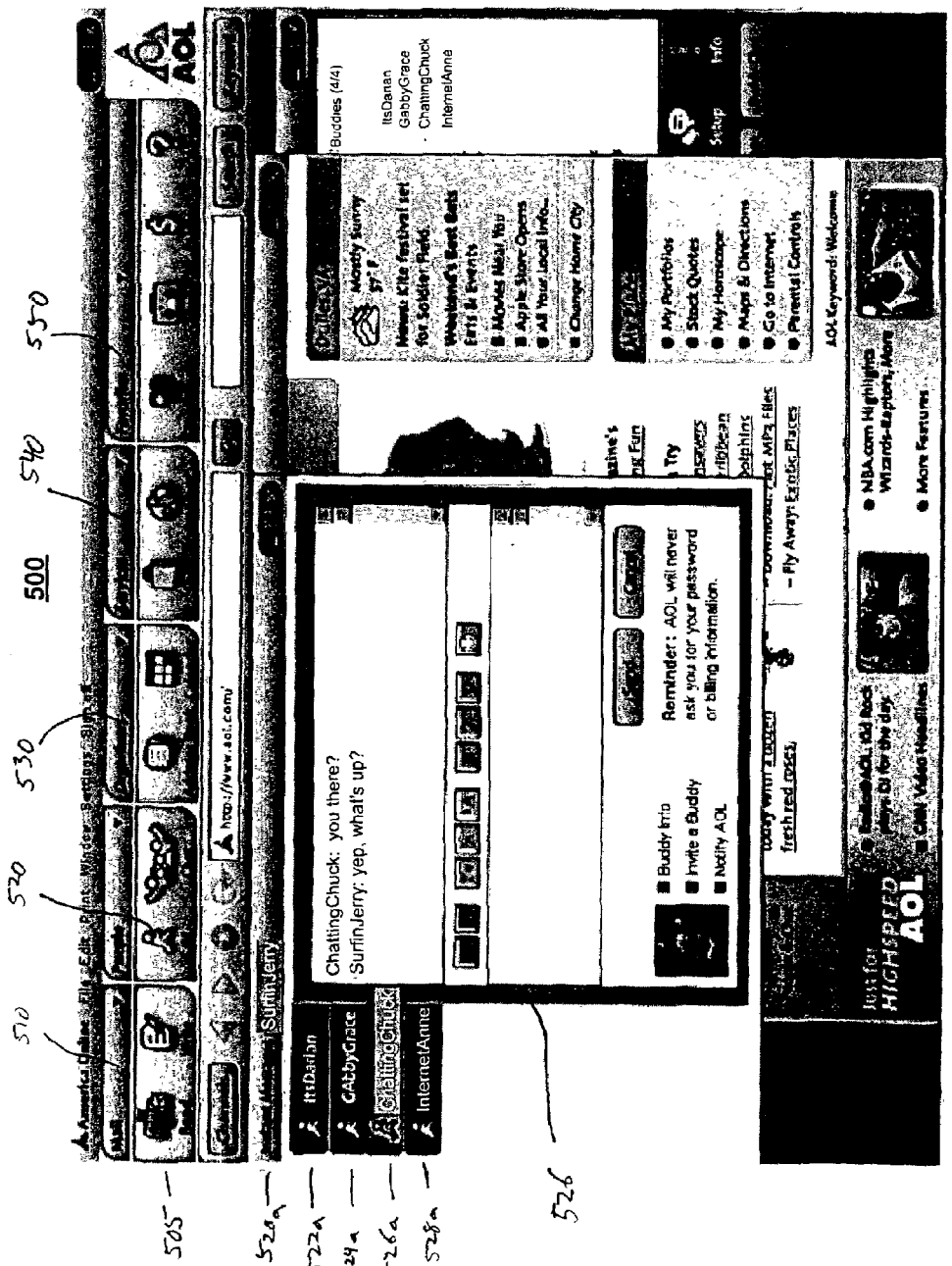
FIGS. 5-10 are illustrations of different graphical user interfaces that may be implemented by the systems of FIGS. 1-3 when executing the process of FIG. 11.

FIG. 5 illustrates an example of a user interface (UI) 500 that may be presented to a user of an online service provider such as AOL. The UI 500 includes a toolbar 505 for quickly enabling activation of features such as, for example, reading or writing e-mail, exchanging IM messages with another user, entering chat areas with other users, shopping or accessing the Internet. The toolbar 505 may include one or more general interface actionable items 510, 520, 530, 540, and 550, each of which is configured to enable activation of an associated user interface. The actionable item may be, for example, a button or a tab.

In the implementation shown by FIG. 5, general actionable item 520 is configured to enable activation of an associated Instant Message (IM) interface 520a, where the IM interface 520a is a tabbed IM interface. IM interface 520a may include one or more sub-interfaces, each having an associated tab and representing a distinct and concurrent IM communications session or "conversation." For example, sub-interface 526 has an associated tab 526a, and represents a distinct and concurrent communications session. As shown in sub-interface 526, the user (SurfinJerry) is able to view a communications session with a buddy "ChattingChuck." The tab 526a persists beyond display of the associated sub-interface 526, identifies the communications session, and allows the user to activate a sub-interface 526 that is not currently displayed. The interface tabs 522a, 524a, 526a, 528a, are arranged in a group such that each interface tab is close or adjacent to another interface tab.

Figure 6:
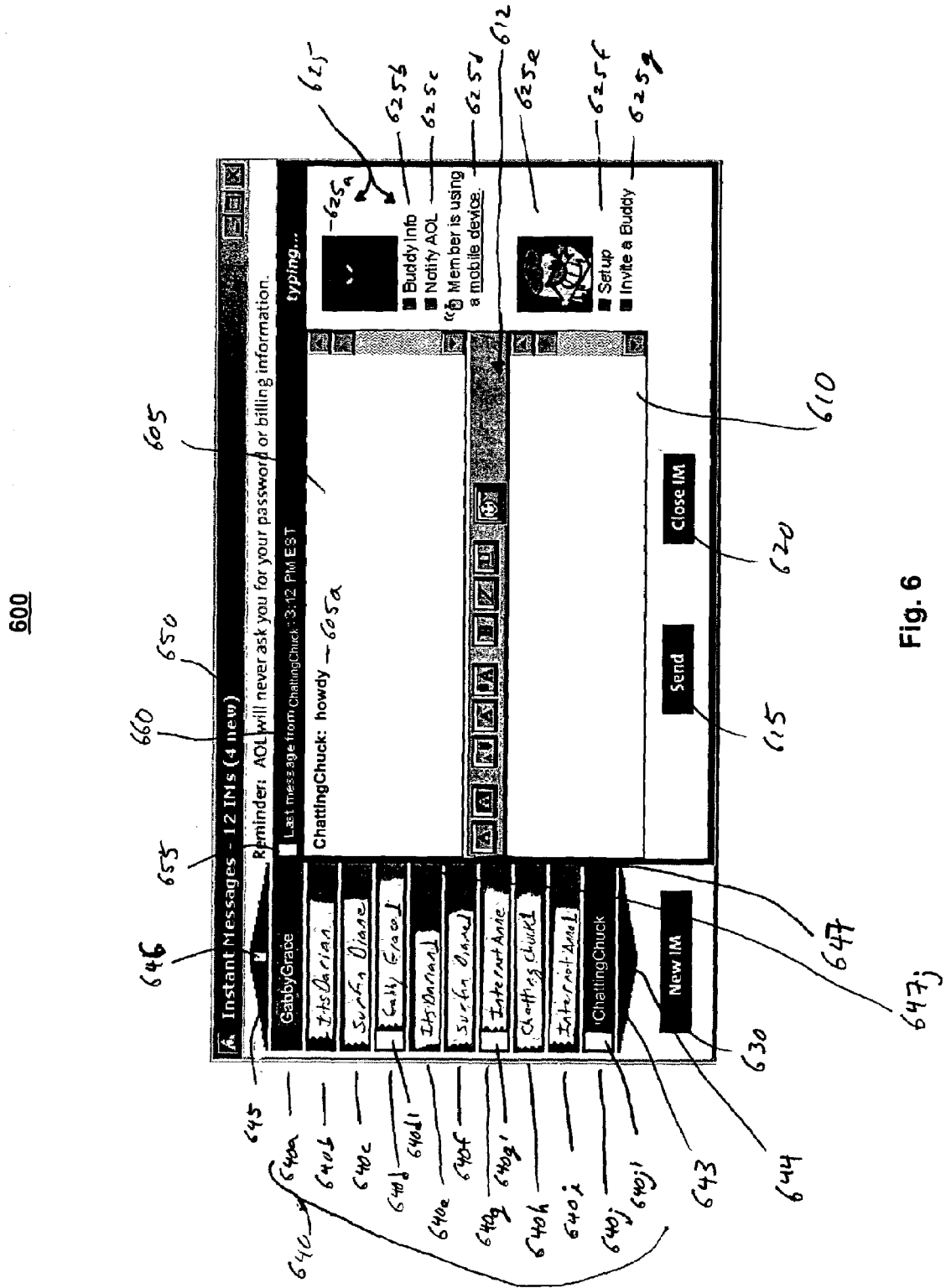

FIG. 6 illustrates one example of a tabbed IM user interface (UI) 600 that may be presented to a user of an IM service provider such as the AOL Instant Messenger (AIM) service provided by America Online. The UI 600 may be rendered in response to user manipulation of a general interface actionable item, such as item 520 of FIG. 5. Although UI 600 may be generated remotely and delivered to a user's client system 105, in general, the tabbed IM user interface 600 will be rendered on or at the user's client system 105 using software stored on that client system 105.

The UI 600 includes an IM display area 605 to display the IM conversation messages 605a of an active IM session, for example, the IM conversation messages in the IM session corresponding to sub-interface 647j and interface tab 640j are displayed in display area 605 of FIG. 6. Specifically, in the example of FIG. 6, the actively displayed IM session involves the buddy having a screen name of "ChattingChuck." An IM compose area 610 may be used to compose a message to send to the IM buddy in the active IM session, typically by selecting the send control button 615 in the UI 600. Font and appearance controls 612 may be provided to control how the message being entered in the IM compose area 610 is displayed to the IM buddy and in the IM display area 605 once the message in the IM compose area 610 is sent. A control button 620 may be provided to close the active IM session. The IM conversation message 605a may include the identity of an IM buddy along with a message from that buddy, and also may include other information such as the time that the conversation message 605a was sent or received.

An area 625 may be provided to display various icons and controls. For example, the area 625 may include a buddy icon 625a corresponding to the IM buddy from which the conversation message 605a was received, and a buddy icon 625e corresponding to the user who has received and is viewing the IM conversation message 605a. Controls provided in area 625 may include a control 625b to retrieve information about the IM buddy, a control 625c to notify the service provider of inappropriate behavior by the IM buddy, a control 625d to indicate to the user whether the IM buddy is using a mobile device, a control 625f to setup various features of the service, and a control 625g to invite a new buddy to join in the IM session, among others. Also, a control button 630 may be provided to initiate a new IM session with a different IM buddy.

The UI 600 contains one or more interface tabs 640, each of which is assigned to a pending IM session and is potentially associated with a sub-interface 647 such as sub-interface 647j. The IM session may use a combination of text, graphics, audio, and video data to communicate with an IM buddy. The IM buddy may be identified by a screen name as shown by, for example, an identifier. The IM buddy typically is another user or an automated system, such as an artificial intelligence system or other automated system or agent having a screen name that responds to IM queries from a user. An active tab 640j corresponds to the IM session that the user views or with which the user interacts currently through, for example, sub-interface 647j. Inactive tabs 640a, 640b, 640c, 640d, 640e, 640f, 640g, 640h, and 640i correspond to other concurrent IM sessions with which the user does not currently view or interact, or sessions that the user is otherwise unable to view.

The UI 600 includes a conversation counter 650 that may provide information relating to the concurrent IM sessions, such as the total number of concurrent IM sessions, the number of new IM sessions, and the number of ongoing IM sessions having a new IM message waiting to be viewed. In general, the conversation counter 650 provides a perceivable indication to the user of statistics regarding the concurrent IM session. In the example of FIG. 6, the conversation counter 650 indicates that there are twelve (12) concurrent IM sessions, and four (4) new IM messages. The UI 600 also includes a manual status control 655 to enable the user to manually indicate whether the last message from the IM buddy corresponding to the IM session for the active tab displayed in the IM display area 605 has been viewed or acknowledged, without having to send an actual reply message to extinguish the new message status. The UI 600 also includes a last message information indicator 660 that provides information about the time that the last message was received from an IM buddy. In the example of FIG. 6, a limit of ten (10) concurrent IM sessions is established as the maximum number of concurrent IM sessions that may be concurrently displayed.

Scroll bars 643 and 645 are provided for scrolling to perceive tabs corresponding to open IM sessions when the total number of concurrent IM sessions exceeds the maximum number of concurrent conversations that may be displayed simultaneously. The scroll bars 643 and 645 allow the user to scroll up and down among the concurrent IM sessions, and provide an indication that one or more of the IM sessions "hidden" by the scroll bar has a new IM message waiting to be viewed. For example, as shown in FIG. 6, scroll bar 643 and scroll bar 645 both are shown to indicate that additional IM sessions may be viewed "above" or "below" the currently illustrated set of ten (10), that is, scroll bar 643 is available to allow the user to view or access an IM session preceding the IM session identified as "GabbyGrace," and similarly, scroll bar 645 is available to allow viewing and access to session(s) following the "ChattingChuck" session. However, either of scroll bar 643 or 645 may be eliminated or grayed out to indicate that no additional IM sessions are available for viewing or access beyond "GabbyGrace" or "ChattingChuck."

Status indicators 644 and 646 may be provided on the scroll bars 643 and 645 to indicate whether one or more of the IM sessions accessible by the scroll bar has a new IM message. In the example of FIG. 6, status indicator 644 (or lack thereof) indicates that there is no new IM message in any IM session covered by the scroll bar 643, while status indicator 646 indicates that there is a new IM message waiting to be viewed in an IM session covered by scroll bar 645.

The interface tabs 640 may include a status indicator 640j1 to indicate whether a new IM message within the IM session corresponding to an interface tab remains pending for review. In general, the indicator 640j1 provides a perceivable status indication to the user that a new message is pending in at least one concurrent IM session. Once the new message is viewed or acknowledged, the indicator 640j1 changes and the conversation counter 650 is updated to reflect one fewer message waiting to be viewed. The interface tabs 640 also may include an identifier, such as the screen name of the IM buddy, to identify the particular IM session to which it is assigned. Although not shown in FIG. 6, the conversation counter 650, the indicator 640j1, or both, may distinguish between a new message received from an ongoing IM session and new message received as part of the initiation of a new IM session.

Figure 7:
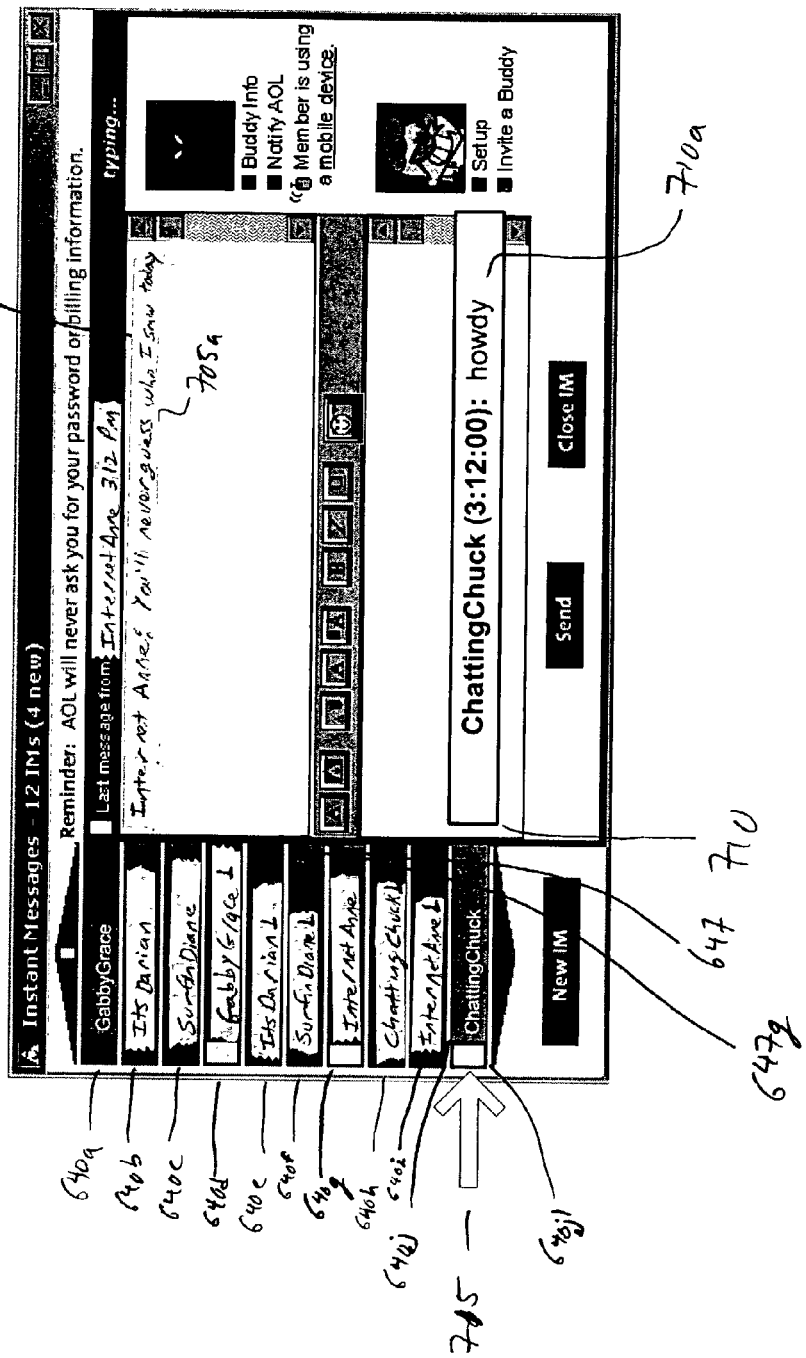

FIG. 7 illustrates an example of a tabbed IM user interface (UI) 700 that is similar to the example discussed above with respect to FIG. 6. In the example of FIG. 7, the interface tab 640g corresponds to the active IM session. A sub-interface 647g corresponds to interface tab 640g and represents the IM session with buddy "InternetAnne," which is currently active. Tabs 640a through 640f and 640h through 640j correspond to inactive IM sessions which are not currently being actively displayed to or manipulated by the user. When tab 640g corresponds to an active IM conversation, the sub-interface 647g corresponding to tab 640g, is displayed or made available to receive user input, as shown by FIG. 7. This sub-interface 647g may replace the sub-interface 647j corresponding to an IM 640j for a previously active IM session, such as that shown in FIG. 6. Alternatively, sub-interfaces for more than one tab and corresponding IM session may remain concurrently displayed, with the sub-interface for a tab corresponding to an active IM session being distinguished from others. The user may desire to perceive information about one of the IM sessions that does not have a displayed sub-interface, while maintaining display of sub-interfaces for the currently active IM session and/or other IM sessions.

An informational tool tip 710 may be provided for the tabbed IM user interface to provide the user with a perceivable indication of at least a portion of an IM communications session that is not being actively displayed. For example, the informational tool tip may show all or a portion of the desired IM conversation 710a with buddy "ChattingChuck," without the user needing to cause active display of the user interface corresponding to the desired IM conversation. The informational tool tip 710 may be provided to enable a user to perceive information relating to the conversations accessible by the scroll bars 643, 645. Also, the informational tool tip may be rendered in various locations on the display. For example, the tool tip may be rendered proximate or close to the interface tab to which the tool tip corresponds.

In order to activate the informational tool tip, the user may select a desired IM session that is not being actively displayed. For example, to activate and render the informational tool tip 710, the user may position a mouse 715 or other user input device proximate to or over the interface tab 640j corresponding to the desired IM session. In one implementation, the informational tool tip 710 is activated as soon as the mouse 715 or other user input device is positioned proximate to or over the interface tab 640j. In another implementation, the informational tool tip 710 is activated and rendered after the mouse 715 or other user input device remains proximate to or positioned over the interface tab 640j for a predetermined threshold period of time, or after some overt selection activity using the mouse or input device. The informational tool tip may be rendered in other locations on the display, or it may be non-visual.

The user may also close or deactivate the informational tool tip 710. For example, the informational tool tip may be automatically closed or deactivated if the user moves the mouse or input device, or if the mouse or input device is moved from a position over or proximate to the interface tab 640j. In another implementation, the tool tip may remain open until the user affirmatively takes an action to close the window.

The informational tool tip 710 may display all or a portion of the desired IM communications session 710a. In one implementation, a pre-determined or limited number of lines or characters of the desired IM session are displayed. In another implementation, a pre-determined number of messages communicated between the buddy and the user are displayed. For instance, as shown with respect to tool tip 810 of FIG. 8, the tool tip may be limited to include only the most recent message from each of the sender 810a and recipient 810b. In yet another implementation, only recent messages within a predetermined time window are displayed. For example, the informational tool tip may show all messages communicated within a predefined threshold period of time, for example, the last thirty (30) minutes. In still another implementation, a predefined threshold period of time, for example, the tool tip may show the entire IM session. The contents of the desired IM session may be made available to the tool tip by, for example, the client system 105 or a host system 110 such as an IM host system 310, or a combination thereof.

Figure 9:
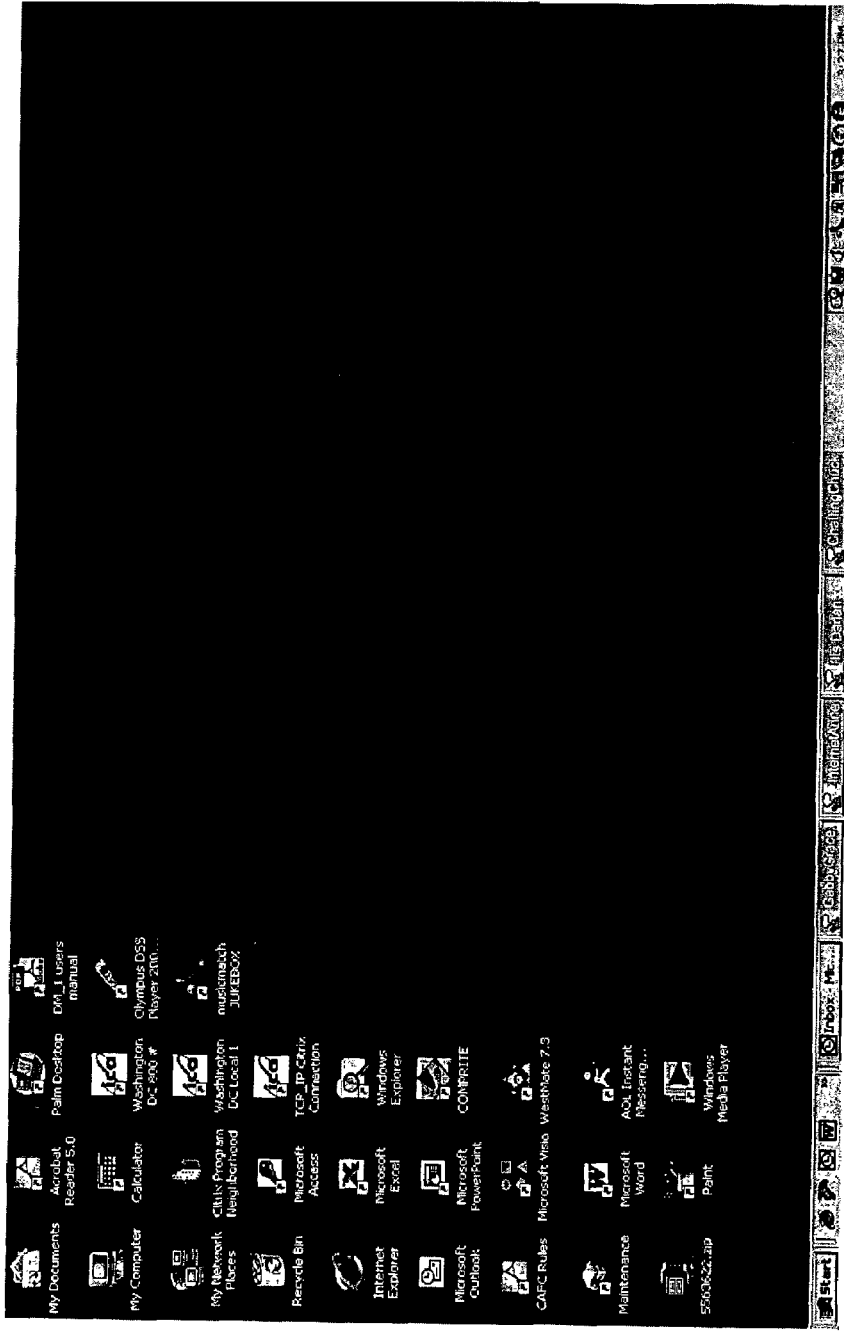

FIG. 9 illustrates another example of an IM UI 900. Although UI 900 may be generated remotely and delivered to a user's client system 105, in general, the UI 900 will be rendered on or at the user's client system 105 using software stored on that client system 105.

The UI 900 includes a task bar 902. The task bar 902 includes one or more interface buttons 905. Interface buttons 905a, 905b, 905c, and 905d, each correspond to a concurrent, inactive IM session. If the user were to select an interface button, a corresponding IM sub-interface containing the IM conversation may be rendered. The sub-interface may be similar to sub-interface 647 described above with respect to FIG. 6.

Figure 10:
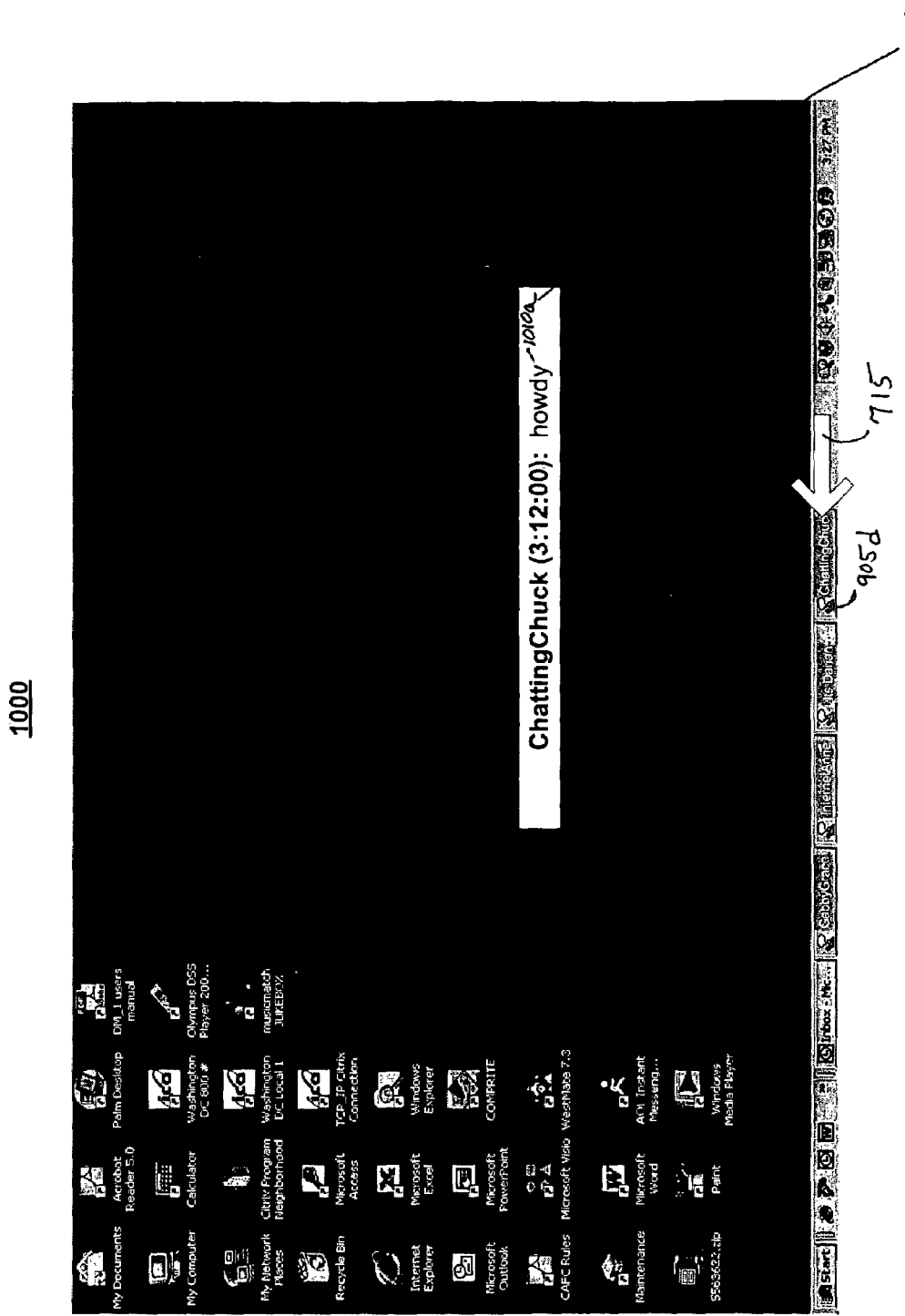

FIG. 10 is an example of an IM UI 1000, which is similar to the example discussed above with respect to FIG. 9. In the example of FIG. 10, an informational tool tip 1010 may be provided for the IM UI, and may have properties similar to the tool tip 710 described above with respect to FIG. 7. The tool tip 1010 may be provided as a pop up window that overlays, rather than reconfigures, the display. The tool tip 1010 provides the user with a perceivable indication of at least a portion of an IM communications session that is not being actively displayed. For example, in response to the selection (implied or overt) of interface button 905 using selector 715, the informational tool tip 1010 may show all or a portion of the desired IM conversation corresponding to interface button 905d with buddy "ChattingChuck," without the user needing to cause active display of the user interface corresponding to the desired IM conversation.

Figure 11:
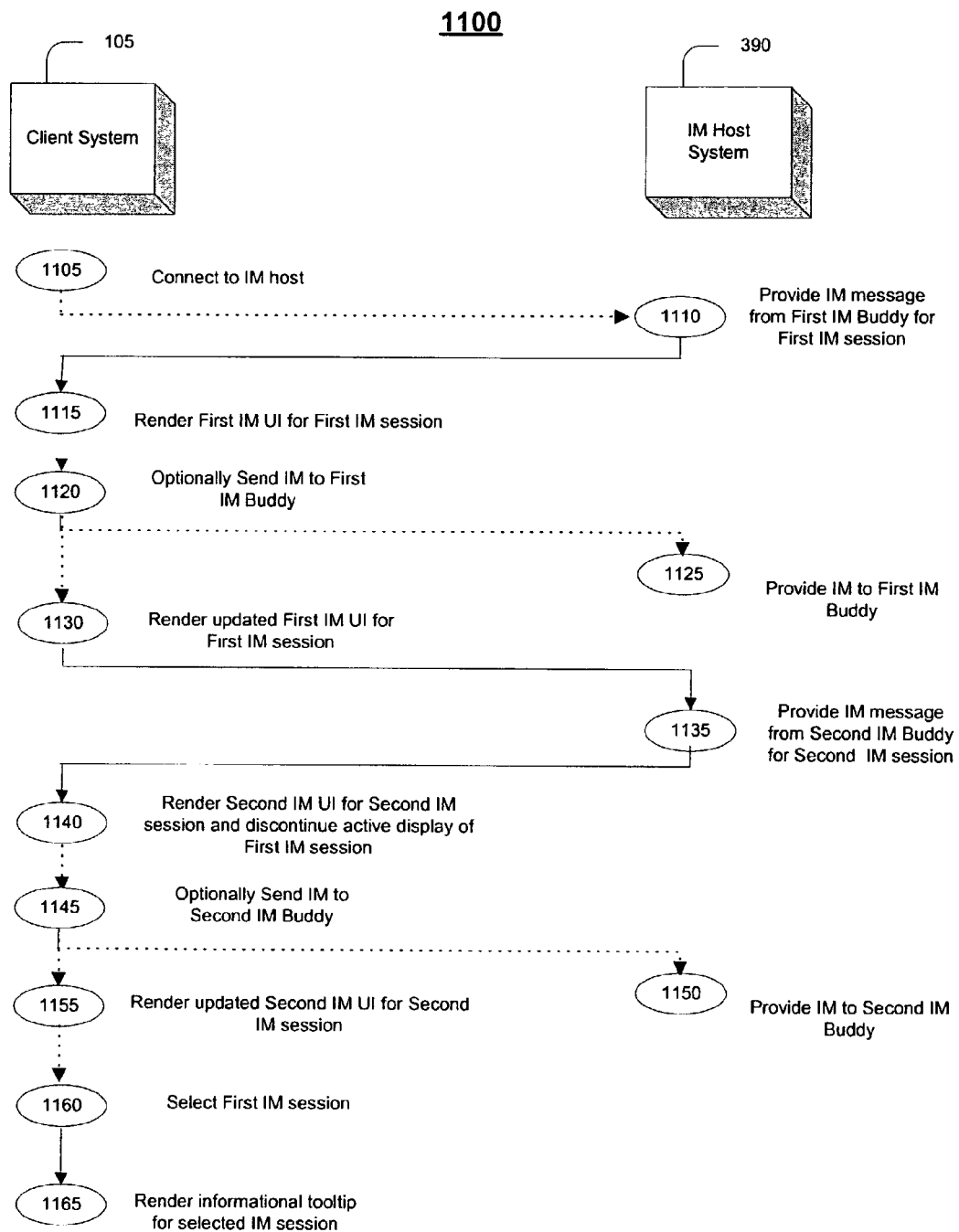
FIG. 11 is a flow chart of a process that may be implemented by the systems of FIGS. 1-3.

Referring to FIG. 11, in one of various possible implementations, a client system 105 and an IM host system 310 may interact according to an exemplary procedure 1100 to provide an informational tool tip for an IM user interface. The client system 105 and IM host system 310 were previously described above with respect to FIGS. 1 and 3. However, the procedure 1100 may be implemented by any type of hardware, software, device, computer, computer system, equipment, component, program, application, code, storage medium, or propagated signal. Furthermore, although not shown in FIG. 11, the client system 105 and the IM host system 310 may be directly or indirectly interconnected through known or described delivery networks, examples of which are described with respect to network 160. In one implementation, the procedure 1100 may be implemented in a client/host context, and the IM user interface may be accessed or updated through a remote device in a client/host environment. In another implementation, the procedure 1100 may be implemented in a standalone or offline client context. The IM user interface may be rendered by the standalone/offline device and may be accessed or updated through a remote device in a non-client/host environment such as, for example, a LAN server serving an end user or a mainframe serving a terminal device. Thus, the procedure 1100 described below may be implemented for any IM user interface of any OSP, ISP, browser and/or other software program having a graphical user interface, such as programs for word processing, stand-alone browsers, spread sheets, and drawing programs.

Procedure 1100 generally involves rendering an informational tool tip for an IM UI. As described, it is particularly relevant to an IM UI having one or more tabs, each interface tab being associated with a sub-interface and assigned to a pending IM session and appearing adjacent to one another while persisting beyond active display of the associated sub-interface. However, procedure 1100 or its concepts may be applied to other applications and interfaces.

In procedure 1100, the client system 105 and the IM host system 310 are physically and/or logically connected (step 1105). For instance, client system 105 may connect to the IM host system 310 across a network (e.g., network 160) by supplying a user identification and password to a server (e.g., a login server) in order to obtain access to the IM host system 310.

Next, the IM host system 310 establishes communications between a first IM buddy (step 1110) and the client system 105. The IM host system 310 deliver an IM message across a network 160, and the IM message may include a text message portion, a time of delivery, and a screen name of the first IM buddy.

Figure 8:
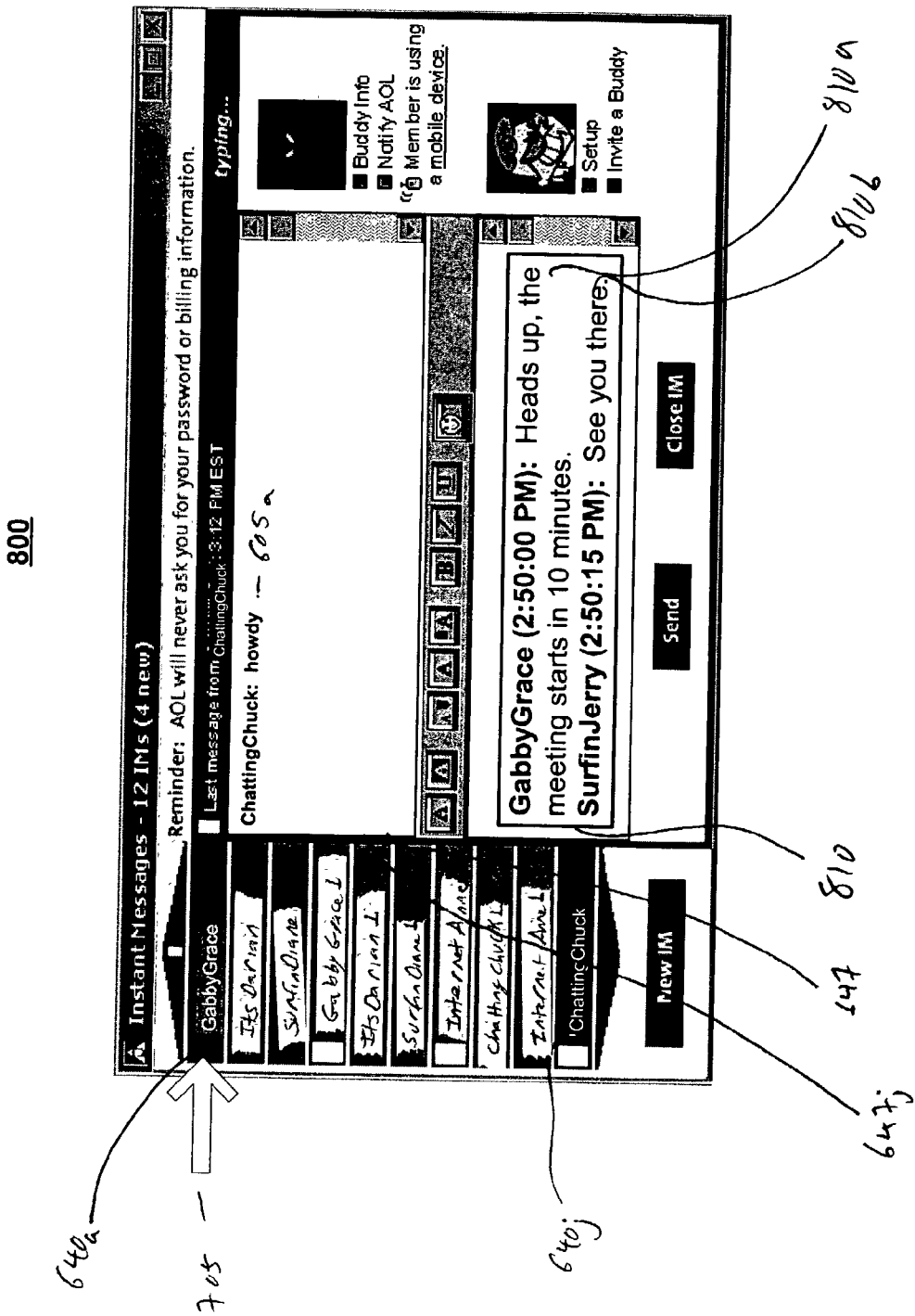

The client system 105 renders a first IM user interface for the first IM session with the first buddy, examples of which were described with respect to FIGS. 6-8 (step 1115). In one implementation, a first interface tab associated with the first IM session is rendered. If the first IM session is to be actively displayed, a first sub-interface associated with the first interface tab also is rendered. Typically, the sub-interface provides a display of the dialog between the user and the buddy in the corresponding IM session or a portion of the corresponding IM session. In one implementation, the client system 105 renders the first interface tab when the IM message from the first IM buddy is provided, and may separately render other portions of the IM user interface 600, 700, 800 at a different time. In another implementation, the entire IM user interface, including the first interface tab, may be rendered when the IM message is provided. The IM UI may be presented using a Web page having text, images, audio, video, and/or any other type of content.

As previously discussed, the IM UI includes a first interface tab corresponding to the first IM session with the first buddy, and also may include other tabs corresponding to other IM sessions with other buddies. For example, FIG. 6 illustrates an example of a tabbed IM UI 600 that may be rendered according to step 1115. The IM UI 600 has a first interface tab 640j associated with the first sub-interface 647j corresponding to the first IM session with the first buddy (e.g., "ChattingChuck" in FIG. 6).

Rendering the IM UI may include initializing or updating one or more of the interface tab, the sub-interface, the status indicator, the identifier, the conversation counter, the display area status indicator, the information indicator, and the display area. For example, as shown in FIG. 6, first interface tab 640j may be rendered with an indicator 640j1. Indicator 640j1 shows that a new message is present in the IM session corresponding to the screen name of the first buddy (e.g., "ChattingChuck" in FIG. 6). The IM message from the first buddy appears in IM display area 605 of the first sub-interface 647j. Conversation counter 650 is updated to show that there are twelve IM sessions and four new messages present waiting to be viewed. Information indicator 660 shows the time of the last message from the first buddy. Also, if the maximum number of concurrent IM sessions or interface tabs corresponding to IM sessions available for display is exceeded when the IM message is provided, then rendering the IM UI may include rendering one or more scroll arrows 643, 645, examples of which were described with respect to FIGS. 6-8.

Using the client system 105, the user may choose to send an IM message back to the first buddy (step 1120). The client system 105 may send the message to the IM host system 310 by providing the IM message across a network 160. The IM message may include a message portion, a time of delivery, and a screen name of the user. The message portion may be a text message, a graphics message, an audio message, or a video message. Referring to FIG. 6, in order to send the message, the user may choose to type the message in the IM compose area 610 of the sub-interface 647 and send the message by selecting the send control 615.

The IM Host system 310 provides the IM message from the user to the first IM buddy (step 1125). The IM host system 310 may provide the IM message across a network 160 to the client system associated with the first buddy (not shown).

Next, the client system 105 renders an updated IM UI for the first IM session (step 1130). The updated UI may be rendered simultaneously with step 1120, or may be rendered at a later time. Rendering an updated IM UI may include updating the interface tab, the sub-interface, the status indicator, the conversation counter, the information indicator, and the display area. For example, referring to FIG. 6, the updated UI 600 may be rendered to update the sub-interface 647j and interface tab 640j, including the indicator 640j1 to show the message provided to the first IM buddy and to show that no new message is present and waiting to be viewed in the IM session corresponding to the interface tab 640j. Display area 605 may be updated to reflect the message provided from the user to the first IM buddy. Conversation counter 650 may be updated to show the new number of IM messages present waiting to be viewed. Information indicator 660 may be updated to shows the time of the user's message. The user's IM message to the first buddy may also be rendered in the IM display area 605 of the sub-interface 647.

The IM host system 310 then provides an IM message from a second IM buddy (step 1135) to the client system 105. As discussed above with respect to step 1110, the IM host system 310 may provide the IM message across a network 160, and the IM message may include a text message portion, a time of delivery, and a screen name of the second IM buddy.

Next, the client system 105 renders a second interface tab for a second IM user interface corresponding to the second IM session with the second buddy, examples of which were described with respect to FIG. 7 (step 1140). In one implementation, the second interface tab is rendered adjacent to the first interface tab. However, other non-adjacent locations for the second interface tab are possible. Typically, the second interface tab 640g will become the active tab and a second sub-interface 647g associated with the second tab 640g will be actively displayed, while the first tab 647j will become an inactive tab and the first sub-interface 647j will no longer be actively displayed. In one implementation, the client system 105 renders the second tab when the IM message from the second IM buddy is provided, and may separately render other portions of the IM user interface at a different time. In another implementation, the entire IM user interface, including the second tab, may be rendered when the IM message is provided.

Rendering the IM UI may include initializing or updating one or more of the interface tab, the sub-interface, the status indicator, the identifier, the conversation counter, the display area status indicator, the information indicator, and the display area. The IM message 705a from the second buddy appears in IM display area 605. Also, if the maximum number of concurrent IM sessions available for display is exceeded when the IM message is provided, then rendering the IM UI may include rendering a scroll arrow, examples of which were described with respect to FIGS. 6-8.

Using the client system 105, the user may choose to send an IM message to the second buddy (step 1145) in a similar fashion to that discussed above with respect to step 1120. Also, similar to the discussion above with respect to step 1125, the IM Host system 310 provides the IM message to the first IM buddy (step 1150).

Next, the client system 105 renders an updated IM UI (step 1155). The updated UI may be rendered simultaneously with step 1145, or may be rendered at a later time. Rendering the updated IM UI may include initializing or updating the interface tab, the sub-interface, status indicator, the identifier, the conversation counter, the display area status indicator, the information indicator, and the display area. The user's IM message to the second buddy also may be rendered in the IM display area 605.

The user may desire to activate an informational tool tip to perceive information about the First IM session which is not being actively displayed, while maintaining active display of the Second IM session. The user selects the First IM session (step 1160). For example, as discussed above with respect to FIGS. 4 and 7, the user may position a mouse 715 or other user input device proximate to or over the interface tab 640*j* corresponding to the desired IM session. In one implementation, the informational tool tip 710 is activated as soon as the mouse 715 or other user input device is positioned proximate to or over the interface tab 640*j*. In another implementation, the informational tool tip 710 is activated and rendered after the mouse 715 or other user input device remains proximate to or positioned over the interface tab 640*j* for a predetermined threshold period of time, or after some overt selection activity using the mouse or input device. The informational tool tip may be rendered in other locations on the display, or it may be non-visual.

Next, the informational tool tip is rendered for the selected IM session, which in this case is the First IM session (step 1165). As discussed above with respect to FIGS. 4 and 7, the informational tool tip 710 may display all or a portion of the desired IM communications session 710*a*. In one implementation, a pre-determined or limited number of lines or characters of the desired IM session are displayed. In another implementation, a pre-determined number of messages communicated between the buddy and the user are displayed. For instance, as shown with respect to tool tip 810 of FIG. 8, the tool tip may be limited to include only message from each of the sender 810*a* and recipient 810*b*. In yet another implementation, only recent messages within a predetermined time window are displayed. For example, the informational tool tip may show all messages communicated within the last thirty (30) minutes. In still another implementation, a predefined threshold period of time, for example, the tool tip may show the entire IM session. The contents of the desired IM session may be made available to the tool tip by, for example, the client system 105 or a host system 110 such as an IM host system 310, or a combination thereof.

The relative placement of steps 1110-1165 with respect to other steps in FIG. 11, and with respect to each other, may vary, and one or more steps may be eliminated altogether. For example, after rendering the first IM UI for the first IM session (step 1115), the user could minimize or otherwise disable active display of the first IM sub-interface, and then proceed to select the first IM session and render the informational tool tip as described in steps 1160 and 1165. In another implementation, the user could initially compose an IM message in a first IM UI to be sent to the first IM buddy, as described in step 1120. Alternatively, the user could receive an IM message in a first IM UI from the first IM buddy without previously having sent a message. Then, the user could minimize or otherwise disable active display of the first IM UI, and then proceed to select the first IM session and render the informational tool tip as described in steps 1160 and 1165. Also, instead of minimizing or disabling active display, the user may activate display of a different window, for example, a window containing an application program such as a word processing program, and position the window over the display of the IM UI. In yet another implementation, a tool tip may be shown by positioning a mouse or other input device over or proximate to other features of the IM UI. For example, a user may position the mouse over status indicator 640*j*1, and if a new message is present then at least a portion of the new message would be displayed in the tool tip.

While some functions of procedure 1100 may be performed entirely by the client system 105, as described, other functions may be performed by the collective operation of the client system 105 and the IM host system 310. For example, an informational tool tip may be rendered entirely by the client. However, the informational tool tip may be rendered based upon information and/or IMs provided to the client by the IM host system.

Other implementations are within the scope of the following claims. For example, although the examples above are given in an IM context, other communications systems with similar attributes may be used. Also, the user interface may be a viewable interface, an audible interface, a tactile interface, or any combination thereof.

What is claimed is:

1. An electronic device configured to store instructions that, when executed by a processor, cause operations including rendering of a user interface that enables perception of information regarding a communications session that leverages an instant messaging platform, the user interface comprising:

an instant messaging application user interface that enables perception and selection of instant messaging communications sessions for a first instant messaging user;

a list of interface labels representative of current communications sessions of the first instant messaging user, each interface label in the list representing a distinct and concurrent communications session, the list including:

an active session interface label representative of an active communications session between the first instant messaging user and a primary instant messaging user, content from the active communications session being displayed;

a subdued session interface label representative of a subdued communications session between the first instant messaging user and a secondary instant messaging user, content from the subdued communications session being hidden from display;

a communications session interface that displays the content from the active communications session, the communications session interface being made perceivable in response to the first instant messaging user using a user input device to select the active session interface label; and an informational tool tip that is activated to provide a perceivable indication to the first instant messaging user of only a sub-set of the content from within the subdued communications session in response to the first instant messaging user positioning the user input device proximate to the subdued session interface label included in the list of interface labels representative of current communications sessions, the communications session interface persisting while the informational tool tip is activated to make perceivable the sub-set of the content from within the subdued communications session, wherein the list of interface labels representative of current communications sessions of the first instant messaging user includes multiple additional subdued session interface labels, each additional subdued session interface label representative of an additional subdued communications session between the first instant messaging user and another user and each additional subdued session interface label configured to enable activation of the informational tool tip to provide a perceivable indication to the first instant messaging user of only a sub-set of the content from within the additional subdued communications session in response to the first instant messaging user positioning the user input device proximate to the additional subdued session interface label.

2. The electronic device of claim 1 in which the informational tool tip provides the perceivable indication in response to the first instant messaging user maintaining the user input device in a position proximate to the subdued session interface label for a predetermined threshold period of time.

3. The electronic device of claim 1 in which the informational tool tip is rendered in a pop up window.

4. The electronic device of claim 1 in which the informational tool tip is rendered as an overlay.

5. The electronic device of claim 1 further comprising automatically closing the tool tip.

6. The electronic device of claim 1 in which the user interface comprises a visual interface.

7. The electronic device of claim 1 in which the user interface comprises an audible interface.

8. The electronic device of claim 1 in which each instant messaging communications session comprises an exchange of one or more text messages.

9. The electronic device of claim 1 in which each instant messaging communications session comprises an exchange of one or more audio messages.

10. The electronic device of claim 1 in which each instant messaging communications session comprises an exchange of one or more video messages.

11. A computer program, stored on a storage medium, comprising instructions for:

rendering an interface that enables perception of information regarding a communications session that leverages an instant messaging platform, the user interface comprising an instant messaging application user interface that enables perception and selection of instant messaging communications sessions for a first instant messaging user;

rendering a list of interface labels representative of current communications sessions of the first instant messaging user, each interface label in the list representing a distinct and concurrent communications session, the list including:

an active session interface label representative of an active communications session between the first instant messaging user and a primary instant messaging user, content from the active communications session being displayed;

a subdued session interface label representative of a subdued communications session between the first instant messaging user and a secondary instant messaging user, content from the subdued communications session being hidden from display;

rendering a communications session interface that displays the content from the active communications session, the communications session interface being made perceivable in response to the first instant messaging user using a user input device to select the active session interface label; and rendering an informational tool tip that is activated to provide a perceivable indication to the first instant messaging user of only a sub-set of the content from within the subdued communications session in response to the first instant messaging user positioning the user input device proximate to the subdued session interface label included in the list of interface labels representative of current communications sessions, the communications session interface persisting while the informational tool tip is activated to make perceivable the sub-set of the content from within the subdued communications session, wherein the list of interface labels representative of current communications sessions of the first instant messaging user includes multiple additional subdued session interface labels, each additional subdued session interface label representative of an additional subdued communications session between the first instant messaging user and another user and each additional subdued session interface label configured to enable activation of the informational tool tip to provide a perceivable indication to the first instant messaging user of only a sub-set of the content from within the additional subdued communications session in response to the first instant messaging user positioning the user input device proximate to the additional subdued session interface label.

12. The computer program of claim 11 in which the informational tool tip provides the perceivable indication in response to the first instant messaging user maintaining the user input device in a position proximate to the subdued session interface label for a predetermined threshold period of time.

13. The computer program of claim 11 in which the informational tool tip is rendered in a pop up window.

14. The computer program of claim 11 in which the informational tool tip is rendered as an overlay.

15. The computer program of claim 11 further comprising instructions for automatically closing the tool tip.

16. The computer program of claim 11 in which the user interface comprises a visual interface.

17. The computer program of claim 11 in which the user interface comprises an audible interface.

18. The computer program of claim 11 in which each instant messaging communications session comprises an exchange of one or more text messages.

19. The computer program of claim 11 in which each instant messaging communications session comprises an exchange of one or more audio messages.

20. The computer program of claim 11 in which each instant messaging communications session comprises an exchange of one or more video messages.

21. A computer program, stored on a storage medium, the computer program comprising:

means for rendering an interface enabling perception of information regarding a communications session that leverages an instant messaging platform, the user interface comprising an instant messaging application user interface that enables perception and selection of instant messaging communications sessions for a first instant messaging user;

means for rendering a list of interface labels representative of current communications sessions of the first instant messaging user, each interface label in the list representing a distinct and concurrent communications session, the list including:
   an active session interface label representative of an active communications session between the first instant messaging user and a primary instant messaging user, content from the active communications session being displayed;
   a subdued session interface label representative of a subdued communications session between the first instant messaging user and a secondary instant messaging user, content from the subdued communications session being hidden from display;
means for rendering a communications session interface that displays the content from the active communications session, the communications session interface being made perceivable in response to the first instant messaging user using a user input device to select the active session interface label; and
means for rendering an informational tool tip that is activated to provide a perceivable indication to the first instant messaging user of only a sub-set of the content from within the subdued communications session in response to the first instant messaging user positioning the user input device proximate to the subdued session interface label included in the list of interface labels representative of current communications sessions, the communications session interface persisting while the informational tool tip is activated to make perceivable the sub-set of the content from within the subdued communications session,
wherein the list of interface labels representative of current communications sessions of the first instant messaging user includes multiple additional subdued session interface labels, each additional subdued session interface label representative of an additional subdued communications session between the first instant messaging user and another user and each additional subdued session interface label configured to enable activation of the informational tool tip to provide a perceivable indication to the first instant messaging user of only a sub-set of the content from within the additional subdued communications session in response to the first instant messaging user positioning the user input device proximate to the additional subdued session interface label.

22. The computer program of claim 21 in which the informational tool tip provides the perceivable indication in response to the first instant messaging user maintaining the user input device proximate to the subdued session interface label predetermined threshold period of time.

23. The computer program of claim 21 in which the informational tool tip is rendered in a pop up window.

24. The computer program of claim 21 in which the informational tool tip is rendered as an overlay.

25. The computer program of claim 21 further comprising means for automatically closing the tool tip.

26. The electronic device of claim 1 wherein the subdued communications session comprises a pending instant messaging session.

27. The electronic device of claim 1 wherein the subdued communications session comprises an ongoing electronic conversation between the first instant messaging user and the secondary instant messaging user.

28. The electronic device of claim 1 wherein the subdued communications session comprises an inactive instant messaging session not currently being viewed or manipulated by the first instant messaging user.

29. The electronic device of claim 1 wherein the content from the subdued communications session was previously displayed in the communications session interface.

30. The electronic device of claim 1 wherein the list is a first list, the interface further comprising:
   a second list of interface labels representative of instant messaging users associated with the first messaging user, wherein:
   the second list is configured to enable perception of online presence information for the instant messaging users represented by the interface labels included in the second list, the second list differs from the first list of interface labels representative of current communications sessions of the first instant messaging user in that the first list includes only a subset of the interface labels included in the second list.

31. The electronic device of claim 30 wherein the second list includes interface labels representative of instant messaging users for which the first instant messaging user is not currently engaging in a communications session, and which are not included on the first list.

32. The electronic device of claim 30 wherein the second list includes an interface label representative of the secondary instant messaging user and the informational tool tip is only activated to provide a perceivable indication to the first instant messaging user of the sub-set of the content from within the subdued communications session in response to the first instant messaging user positioning the user input device proximate to the subdued session interface label included in the list of interface labels representative of current communications sessions.

33. The electronic device of claim 1 wherein each interface label included in the list of interface labels representative of current communications sessions of the first instant messaging user, other than the active session interface label, is configured to enable activation of the informational tool tip.

34. An electronic device configured to store instructions that, when executed by a processor, cause operations including rendering of a user interface that enables perception of information regarding a communications session that leverages an instant messaging platform, the user interface comprising:
   an instant messaging application user interface that enables perception and selection of instant messaging communications sessions for a first instant messaging user;
   a first list of interface labels representative of current communications sessions of the first instant messaging user, each interface label in the first list representing a distinct and concurrent communications session, the first list including:
      an active session interface label representative of an active communications session between the first instant messaging user and a primary instant messaging user, content from the active communications session being displayed;
      a subdued session interface label representative of a subdued communications session between the first instant messaging user and a secondary instant messaging user, content from the subdued communications session being hidden from display;
   a communications session interface that displays the content from the active communications session, the communications session interface being made perceivable in response to the first instant messaging user using a user input device to select the active session interface label;

an informational tool tip that is activated to provide a perceivable indication to the first instant messaging user of only a sub-set of the content from within the subdued communications session in response to the first instant messaging user positioning the user input device proximate to the subdued session interface label included in the first list of interface labels representative of current communications sessions, the communications session interface persisting while the informational tool tip is activated to make perceivable the sub-set of the content from within the subdued communications session; and a second list of interface labels representative of instant messaging users associated with the first messaging user, wherein:

the second list is configured to enable perception of online presence information for the instant messaging users represented by the interface labels included in the second list, the second list differs from the first list of interface labels representative of current communications sessions of the first instant messaging user in that the first list includes only a subset of the interface labels included in the second list, the second list includes an interface label representative of the secondary instant messaging user and the informational tool tip is only activated to provide a perceivable indication to the first instant messaging user of the sub-set of the content from within the subdued communications session in response to the first instant messaging user positioning the user input device proximate to the subdued session interface label included in the list of interface labels representative of current communications sessions.

35. The electronic device of claim 34 wherein the subdued communications session comprises an ongoing electronic conversation between the first instant messaging user and the secondary instant messaging user.

36. The electronic device of claim 34 wherein the subdued communications session comprises an inactive instant messaging session not currently being viewed or manipulated by the first instant messaging user.

37. The electronic device of claim 34 wherein the content from the subdued communications session was previously displayed in the communications session interface.

38. The electronic device of claim 34 wherein each interface label included in the list of interface labels representative of current communications sessions of the first instant messaging user, other than the active session interface label, is configured to enable activation of the informational tool tip.

39. The electronic device of claim 34 wherein the sub-set of the content from within the subdued communications session includes content from multiple messages exchanged in the subdued communications session.

40. The electronic device of claim 39 wherein the content from the multiple messages exchanged in the subdued communications session includes content from a first message and a second message exchanged subsequent to exchange of the first message.

41. The electronic device of claim 39 wherein the content from the multiple messages exchanged in the subdued communications session includes content from at least one message sent by the first instant messaging user and at least one message sent by the secondary instant messaging user.

42. The electronic device of claim 41 wherein the content from the multiple messages exchanged in the subdued communications session includes content from only a most recent message sent by the first instant messaging user and a most recent message sent by the secondary instant messaging user.

43. A computer program, stored on a storage medium, comprising instructions for:

rendering an interface that enables perception of information regarding a communications session that leverages an instant messaging platform, the user interface comprising an instant messaging application user interface that enables perception and selection of instant messaging communications sessions for a first instant messaging user;

rendering a first list of interface labels representative of current communications sessions of the first instant messaging user, each interface label in the first list representing a distinct and concurrent communications session, the first list including:

an active session interface label representative of an active communications session between the first instant messaging user and a primary instant messaging user, content from the active communications session being displayed;

a subdued session interface label representative of a subdued communications session between the first instant messaging user and a secondary instant messaging user, content from the subdued communications session being hidden from display;

rendering a communications session interface that displays the content from the active communications session, the communications session interface being made perceivable in response to the first instant messaging user using a user input device to select the active session interface label;

rendering an informational tool tip that is activated to provide a perceivable indication to the first instant messaging user of only a sub-set of the content from within the subdued communications session in response to the first instant messaging user positioning the user input device proximate to the subdued session interface label included in the first list of interface labels representative of current communications sessions, the communications session interface persisting while the informational tool tip is activated to make perceivable the sub-set of the content from within the subdued communications session; and rendering a second list of interface labels representative of instant messaging users associated with the first messaging user, wherein:

the second list is configured to enable perception of online presence information for the instant messaging users represented by the interface labels included in the second list, the second list differs from the first list of interface labels representative of current communications sessions of the first instant messaging user in that the first list includes only a subset of the interface labels included in the second list, and the second list includes an interface label representative of the secondary instant messaging user and the informational tool tip is only activated to provide a perceivable indication to the first instant messaging user of the sub-set of the content from within the subdued communications session in response to the first instant messaging user positioning the user input device proximate to the subdued session interface label included in the list of interface labels representative of current communications sessions.

44. The computer program of claim 43 wherein the subdued communications session comprises an ongoing electronic conversation between the first instant messaging user and the secondary instant messaging user.

45. The computer program of claim 43 wherein the subdued communications session comprises an inactive instant messaging session not currently being viewed or manipulated by the first instant messaging user.

46. The computer program of claim 43 wherein the content from the subdued communications session was previously displayed in the communications session interface.

47. The computer program of claim 43 wherein each interface label included in the list of interface labels representative of current communications sessions of the first instant messaging user, other than the active session interface label, is configured to enable activation of the informational tool tip.

48. The computer program of claim 43 wherein the sub-set of the content from within the subdued communications session includes content from multiple messages exchanged in the subdued communications session.

49. The computer program of claim 48 wherein the content from the multiple messages exchanged in the subdued communications session includes content from a first message and a second message exchanged subsequent to exchange of the first message.

50. The computer program of claim 48 wherein the content from the multiple messages exchanged in the subdued communications session includes content from at least one message sent by the first instant messaging user and at least one message sent by the secondary instant messaging user.

51. The computer program of claim 50 wherein the content from the multiple messages exchanged in the subdued communications session includes content from only a most recent message sent by the first instant messaging user and a most recent message sent by the secondary instant messaging user.

52. A computer program, stored on a storage medium, the computer program comprising:

means for rendering an interface enabling perception of information regarding a communications session that leverages an instant messaging platform, the user interface comprising an instant messaging application user interface that enables perception and selection of instant messaging communications sessions for a first instant messaging user;

means for rendering a list of interface labels representative of current communications sessions of the first instant messaging user, each interface label in the list representing a distinct and concurrent communications session, the list including:

an active session interface label representative of an active communications session between the first instant messaging user and a primary instant messaging user, content from the active communications session being displayed;

a subdued session interface label representative of a subdued communications session between the first instant messaging user and a secondary instant messaging user, content from the subdued communications session being hidden from display;

means for rendering a communications session interface that displays the content from the active communications session, the communications session interface being made perceivable in response to the first instant messaging user using a user input device to select the active session interface label;

means for rendering an informational tool tip that is activated to provide a perceivable indication to the first instant messaging user of only a sub-set of the content from within the subdued communications session in response to the first instant messaging user positioning the user input device proximate to the subdued session interface label included in the list of interface labels representative of current communications sessions, the communications session interface persisting while the informational tool tip is activated to make perceivable the sub-set of the content from within the subdued communications session; and means for rendering a second list of interface labels representative of instant messaging users associated with the first messaging user, wherein:

the second list is configured to enable perception of online presence information for the instant messaging users represented by the interface labels included in the second list, the second list differs from the first list of interface labels representative of current communications sessions of the first instant messaging user in that the first list includes only a subset of the interface labels included in the second list, and the second list includes an interface label representative of the secondary instant messaging user and the informational tool tip is only activated to provide a perceivable indication to the first instant messaging user of the sub-set of the content from within the subdued communications session in response to the first instant messaging user positioning the user input device proximate to the subdued session interface label included in the list of interface labels representative of current communications sessions.

* * * * *